United States Patent
McKay

(10) Patent No.: US 7,317,430 B2
(45) Date of Patent: Jan. 8, 2008

(54) DISPLAY PANELS AND METHODS AND APPARATUS FOR DRIVING THE SAME

(75) Inventor: Brent McKay, Newport Beach, CA (US)

(73) Assignee: IP Mining Corporation, Newport Beach, CA (US)

( * ) Notice: Subject to any disclaimer, the term of this patent is extended or adjusted under 35 U.S.C. 154(b) by 315 days.

(21) Appl. No.: 10/660,818

(22) Filed: Sep. 12, 2003

(65) Prior Publication Data

US 2004/0125097 A1    Jul. 1, 2004

Related U.S. Application Data

(63) Continuation-in-part of application No. 10/004,281, filed on Oct. 31, 2001, and a continuation-in-part of application No. 09/943,585, filed on Aug. 30, 2001.

(60) Provisional application No. 60/410,539, filed on Sep. 12, 2002.

(51) Int. Cl.
G09G 3/28      (2006.01)
H04N 3/20      (2006.01)

(52) U.S. Cl. ............................. 345/60; 348/173

(58) Field of Classification Search ............ 345/60–62, 345/65; 348/173
See application file for complete search history.

(56) References Cited

U.S. PATENT DOCUMENTS 4,670,784 A * 6/1987 Goldberg ................. 348/556

2002/0030674 A1 * 3/2002 Shigeta ..................... 345/204
2003/0142212 A1 * 7/2003 Grimes et al. ............. 348/173
2004/0165064 A1 * 8/2004 Weitbruch et al. ......... 348/173

FOREIGN PATENT DOCUMENTS

JP         11-175022 A      *    4/1999

* cited by examiner

Primary Examiner—Amr A. Awad
Assistant Examiner—Steven E Holton
(74) Attorney, Agent, or Firm—Farjami & Farjami LLP

(57) ABSTRACT

Methods and apparatus for mitigating or substantially eliminating pixel burn-in on phosphor-based display panels. A visual display includes a display installation and a computer. The display installation may include a display panel having including a plurality of pixels each with a bit depth and an interface for receiving a video input and for driving the display panel. The computer is configured to determine a primary burn value for each of the pixels for a primary period of time, and to determine a secondary burn value for each of the pixels for a secondary period of time. The computer determines the secondary burn values such that when a pixel is driven at the secondary burn value thereof for the secondary period of time, an average value of the pixel for the primary and secondary periods of time is approximately equal to one-half of the bit depth of the pixel.

75 Claims, 10 Drawing Sheets

DISPLAY PANELS AND METHODS AND APPARATUS FOR DRIVING THE SAME

CROSS REFERENCE TO RELATED APPLICATIONS

The present application claims priority under 35 U.S.C. § 119(e) on U.S. Provisional Application for Patent Ser. No. 60/410,539 filed Sep. 12, 2002. In addition, the present application is a continuation-in-part application of and claims priority under 35 U.S.C. § 120 on U.S. patent application Ser. No. 09/943,585 filed Aug. 30, 2001, and on U.S. patent application Ser. No. 10/004,281 filed Oct. 31, 2001. Each of these three prior applications is incorporated herein by reference.

BACKGROUND

Recent years have seen considerable advances in the dynamic information presentation marketplace, particularly with regard to the use of plasma display technology. Conventionally, the dynamic advertising market uses networked plasma-based display systems because of its excellent optical characteristics, thin profile and wide viewing angle. Since the original commercial introduction of 42-inch plasma display products, use of this technology as a "Digital Ad Board" has become fairly commonplace. In a Digital Ad Board application the entire screen is typically used to display an "ad loop," or a series of full-screen advertisements that cycle on a regular basis.

One peculiarity of plasma display technology is its tendency to "burn in" if a static image is displayed in the same location over a continued period of time. This burn-in is a physical property of plasma display technology and is not likely to be eliminated through core technology advancements. The burn-in is caused by a natural degradation of the amount of light output the phosphor chemicals emit as they continue to be "excited" over time, and translates to a "ghost image" when the same image is displayed in the same location for a prolonged period. When a static image like this is displayed, pixels that were "on 100%" (displaying white) would be degrading at the maximum rate while pixels that were "turned off" (displaying black) would not be degrading at all. Over time, after these two groups of pixels were displaying the same color, a noticeable variation in light output for the two groups occurs and the ghost image becomes recognizable.

For Digital Ad Board applications, this characteristic is not too problematic as long as the ad segments that comprise the ad loop represent sufficient variation over the cycle so as to approach a fully dynamic (random) presentation at each pixel of the display. In practice, this would translate to setting a maximum duty cycle of 1% or so for any given image (depending on the native characteristics of the particular plasma display used, the color gradation of the images, the frequency of changes of the ad loop itself, and whether any image spiraling techniques were used to reduce the native burn rate). The net result of a fully dynamic ad loop is that all pixels of the display would degrade roughly the same amount over time, and no ghost effect would be noticed.

For digital signage applications other than Digital Ad Boards ("General Purpose Digital Signage"), the impact of burn-in is far more pronounced. In these applications, at least some portion of the display is not presenting a series of images or video; rather, it would generally include some fixed or pseudo-fixed images that would be present over an extended period of time. For example, as a Flight Information Display in an airport or as a Digital Menu Board in a quick service restaurant, there are generally fixed text fields and frequently fixed text that would be displayed; generating random location patterns is simply not practical in most cases. For these applications, the effect of burn-in becomes dramatic and, in many cases, would prevent the use of plasma technology. Furthermore, eliminating plasma display technology from consideration limits the use of digital displays at all in many of these applications since there are currently no other practical alternatives.

In order to reduce the rate of burn, some plasma manufacturers have incorporated electronics that periodically shifts the image around in a spiral or other pattern, usually within a 5 pixel radius. Although this technique reduces the rate of burn-in, it does not eliminate it; additionally, it introduces a noticeable and distracting movement of the screen image which is particularly noticeable when the user is reading text at the time of the movement.

Furthermore, Digital Menu Board applications generally have zero tolerance to down time; if the menu is not visible the patrons cannot effectively place orders and the entire operation can be sidetracked. Given the typical layout of traditional menu boards that include menu lists (critical) and promotional images (non-critical) content, it is possible to construct a system for multiple display installations that can automatically recover from a single-unit hardware failure by redeploying critical information to the remaining display(s). By doing so, this fault-tolerant design addresses the most critical issue currently stifling the conversion to a digital paradigm: what if the hardware fails?

Wayfinding is one specific digital signage application that utilizes interactive plasma (or other large-screen) display technology to deliver facility directory and other relevant information services. As described in the related U.S. Patent Application Publication Nos. 2002/0078459 and 2002/0165781, the user interface architecture must be conducive to intuitive operation and must blend the generally divergent influences of information and advertising components (when a hybrid advertising/public information model is being used). The marketplace has demonstrated unequivocally that user acceptance of interactive public information systems is paramount to their commercial success, and to date few products of this kind have succeeded even though many have been tried.

Because of the fact that wayfinding users are in a transient mode within a public space, small delays that might be acceptable in a desktop interface may cause the user to disengage in a wayfinding environment. In order to achieve intuitive operation, the interface design must be focused and elements must be carefully chosen so that new users to the system are able to navigate to the desired information quickly and with minimal effort. In order to achieve the desired result, one must focus on three main areas of the interface design:

"Default Screen" architecture. This is the interface displayed while the system is not in use.

"Content Presentation" architecture. This is the interface displayed after the system is engaged by the user.

"Navigation Feedback Mechanisms." These are visual and audio elements incorporated into the navigation sequence to assist the user in quickly understanding what information is being presented and what additional information is available.

In view of the foregoing, there remains a need in the art for enhanced display panels and associated apparatus and methodology for driving such display panels.

SUMMARY

A visual display including a display installation and a computer is disclosed. The display installation may include a display panel having including a plurality of pixels each with a bit depth and an interface for receiving a video input and for driving the display panel. The computer is configured to determine a primary burn value for each of the pixels for a primary period of time, and to determine a secondary burn value for each of the pixels for a secondary period of time. The computer determines the secondary burn values such that when a pixel is driven at the secondary burn value thereof for the secondary period of time, an average value of the pixel for the primary and secondary periods of time is approximately equal to one-half of the bit depth of the pixel.

In an embodiment, a computer may control or operate a display panel by first determining a primary burn value for each of the pixels in the display panel during an active burn mode. The computer may then identify one of the pixels that has a low primary burn value, thereby indicating that the identified pixel has been burned at a greater degree than pixels having higher primary burn values. The computer may then determine a number of pixels that have primary burn values higher than the low primary burn value, thus indicating that these pixels have been burned at a lesser degree than the identified pixel with the low burn value. The computer may then cause the interface to drive the display panel during a reverse burn mode such that the pixels having a primary burn value higher than the low primary burn value of the identified pixel are burned to reduce the respective differences between higher primary burn values and the low primary burn value.

In yet another embodiment, a computer may control a display panel by monitoring an image history of the pixels during an active burn mode and then identifying a pixel that has been burned at a greater degree than a number of other pixels. The computer may then determine a number of pixels that have been burned at a lesser degree than the identified pixel. The display panel may then be driven during a reverse burn mode such that the number of pixels that have been burned at a lesser degree are burned to reduce the burn difference between each of the number of pixels and the identified pixel.

Other features and advantages of the display panels disclosed herein will become apparent to those skilled in the art from a consideration of the following detailed description taken in conjunction with the accompanying drawings.

BRIEF DESCRIPTION OF THE DRAWINGS

These and other features, aspects and advantages to a visual display panel will be more fully understood when considered with respect to the following specification, appended claims and accompanying drawings, wherein:

DETAILED DESCRIPTION

Figure 1:
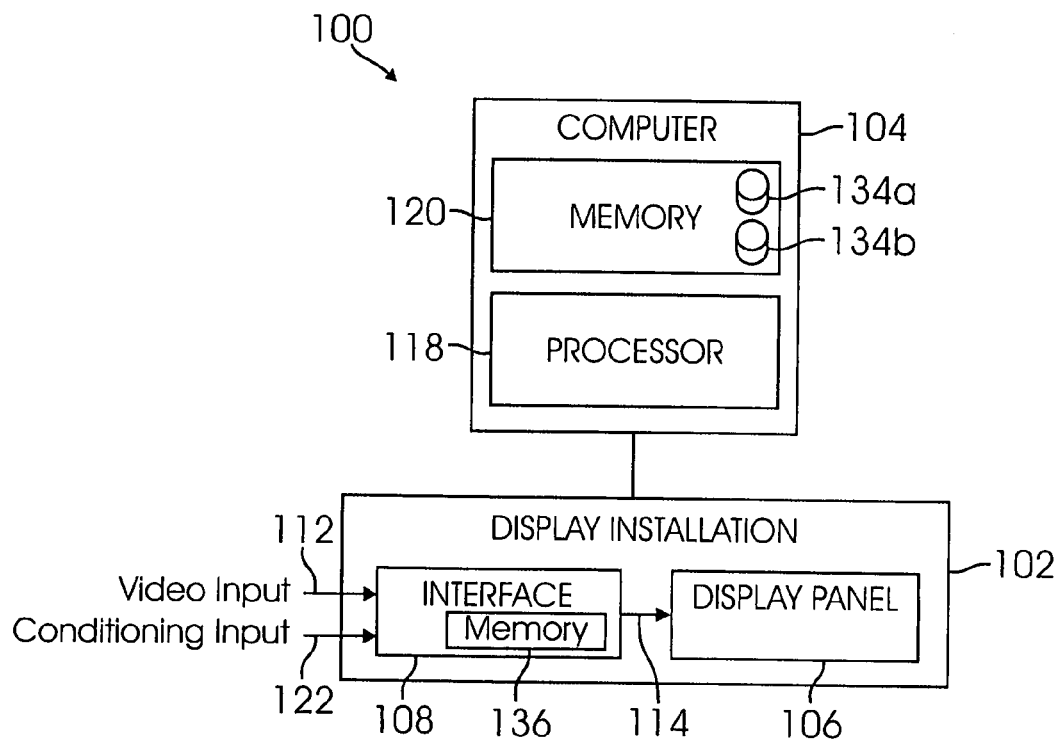
FIG. 1 is a block diagram illustrating a visual display.
Figure 2:
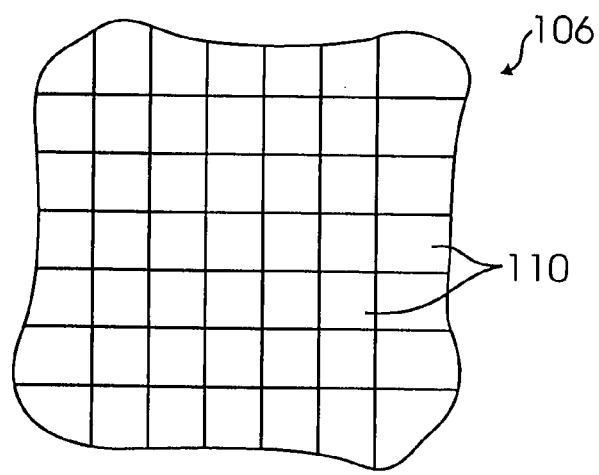
FIG. 2 schematically illustrates pixels of a display panel.

Referring to the drawings in more detail, an embodiment of a visual display 100 is illustrated in FIG. 1. According to a number of embodiments, the visual display 100 may include a display installation 102 and a computer 104. The display installation 102 may include a display panel 106 and an interface 108 in communication with the panel 106. The display panel 106, which in some of the embodiments includes a plasma display panel, has a matrix or a plurality of pixels 110 as represented in FIG. 2. With additional reference to FIG. 3, the interface 108 receives a video input 112 (S100) and responsively drives the display panel 106 (S102) with a drive signal 114.

According to a number of embodiments, the computer 104 is configured to condition the display panel 106 in response to the video input 112. This panel conditioning feature mitigates uneven burn-in of the pictures where the display panel 106 is not used in an ideal dynamic mode in which all of the pixels are burned at the same rate and intensity. For example and with additional reference to FIG. 3, in some of the embodiments, during a primary period of time $\Delta T_1$, the computer 104 may monitor an image history (S104) of the pixels 110.

For the purposes of this description, the primary period of time $\Delta T_1$ may be defined as a period of time during which the interface 108 is driving the panel 106 to display a desired or a predetermined video input 112, such as a sequence of advertising images or a sequence of images resulting from an interactive selection (which will be discussed in more detail below). Also for the purposes of this description, the display installation 102 may be described as operating in an active burn mode during the primary period of time $\Delta T_1$, which is indicated by reference numeral 116 in FIG. 3. In addition, each pixel (or picture element) 110 has a bit depth that equals $2^N$ where N is the number of bits (e.g., 8 or 10) and a specific set of spatial coordinates within the panel 106 that uniquely identifies the pixel.

Further, for the purposes of this description, the image history may include data indicative of the color and the intensity of each pixel 110 during the active burn mode 116 of the panel 106. For example, in embodiments in which each of the pixels 110 includes a color set having a plurality of color values each with a bit depth, e.g., red-green-blue (RGB) color values each ranging from 0 to 255, the image history may include data indicative of the each set of color values driving each of the pixels 110. More specifically, the drive signal 114 may include a drive value for each pixel 110, with the drive value including a value for each of the color values, e.g., 128-128-128 for gray, 255-0-0 for red, or 0-0-0 for white. During the active burn mode 116, the interface 108 may drive the display panel 106 such that each of the pixels 110 is driven at a plurality of drive values.

The computer 104, which may include a processor 118 and a memory 120, may then store the image history in a database in the memory 120 (S106). Based on the image history, the computer 104 may then determine a primary burn value $B_1$ (S108) for each of the pixels 110 during the active burn mode 116 (i.e., during the primary period of time $\Delta T_1$). In a number of embodiments, the primary burn value $B_1$ for a pixel 110 may be an average value of the pixel during the active burn mode 116.

The computer 104 may then determine a secondary burn value $B_2$ (S110) for each of the pixels 110. The secondary burn value $B_1$ is calculated to complement or even out the burn-in effects the primary burn value $B_1$ had on a respective pixel 110. For example, in a number of embodiments, the second burn value $B_2$ is determined such that when a pixel 110 is driven at the secondary burn value $B_2$ for a secondary period of time $\Delta T_2$, an average value of the pixel for the primary period of time $\Delta T_1$ (i.e., the active burn mode 116) and secondary period of time $\Delta T_2$ is approximately equal to one-half of the bit depth of the pixel, that is:

$$(B_1+B_2) \div 2 = 2^N \div 2, \text{ or}$$

$$B_1+B_2 = 2^N,$$

where: $B_1$ is the primary burn value of a pixel;
$B_2$ is the secondary burn value of the pixel; and
$2^N$ is the bit depth of the pixel.

Accordingly, in some of the embodiments, the computer 104 may calculate the secondary burn value $B_2$ of each pixel to be the difference of the bit depth and the primary burn value, namely:

$$B_2 = 2 - B_1.$$

Based on the secondary burn values $B_2$ of the pixels 110, the computer 104 may then generate a conditioning input 122 (S112) and provide the conditioning input 122 to the interface 108. Upon receiving the conditioning input 122 (S114), the interface 108 may then drive the panel display 106 for the secondary period of time $\Delta T_2$. For the purposes of this description, the display installation 102 may be described as operating in a reverse burn mode during the secondary period of time $\Delta T_2$, which is indicated by reference numeral 124 in FIG. 3.

During the reverse burn mode 124, the interface 108 generates the drive signal 114 responsive to the conditioning input 122. After driving the display panel 106 during the reverse burn mode 124 (i.e., for the secondary period of time $\Delta T_2$), the interface 108 may then return to the active burn mode 116 and receive another video input 112 (S100). Also during the reverse burn mode 124, the interface 108 drives the display panel 106 to counteract burn-in of pixels 110 during the active burn mode 116 so that each of the pixels 110 degrades or burns out at the same rate, thereby reducing or substantially eliminating ghosts in subsequent active burn modes 116.

For example, in embodiments where each pixel 110 has a RGB color set with a bit depth of 256, if the primary burn value $B_1$ of a pixel 110 is 0-0-0 for a primary period of time $\Delta T_1$ of 8 hours, then the secondary burn value $B_2$ of the pixel may be 255-255-255 for a secondary period of time $\Delta T_2$ of 8 hours, such that the average value of the pixel for a full duty cycle $\Delta T_1+\Delta T_2$ (i.e., during the active and reverse burn modes 116 and 124) is 128-128-128, wherein the primary and secondary periods of time are approximately equal. Alternatively, if the primary burn value $B_1$ of a pixel 110 is 0-0-0 for a primary period of time $\Delta T_1$ of 8 hours, then the secondary burn value $B_2$ of the pixel may be 234-234-234 for a secondary period of time $\Delta T_2$ of 16 hours, such that the average value of the pixel for a full duty cycle $\Delta T_1+\Delta T_2$ is still 128-128-128.

In a number of embodiments, the computer 104 may include software stored in memory 120 for use by the processor 118 to carry out the foregoing functionality of the visual display 100. In other embodiments, the computer 104 may be a single-board computer with a graphics card connected to the interface 108.

Figure 3:
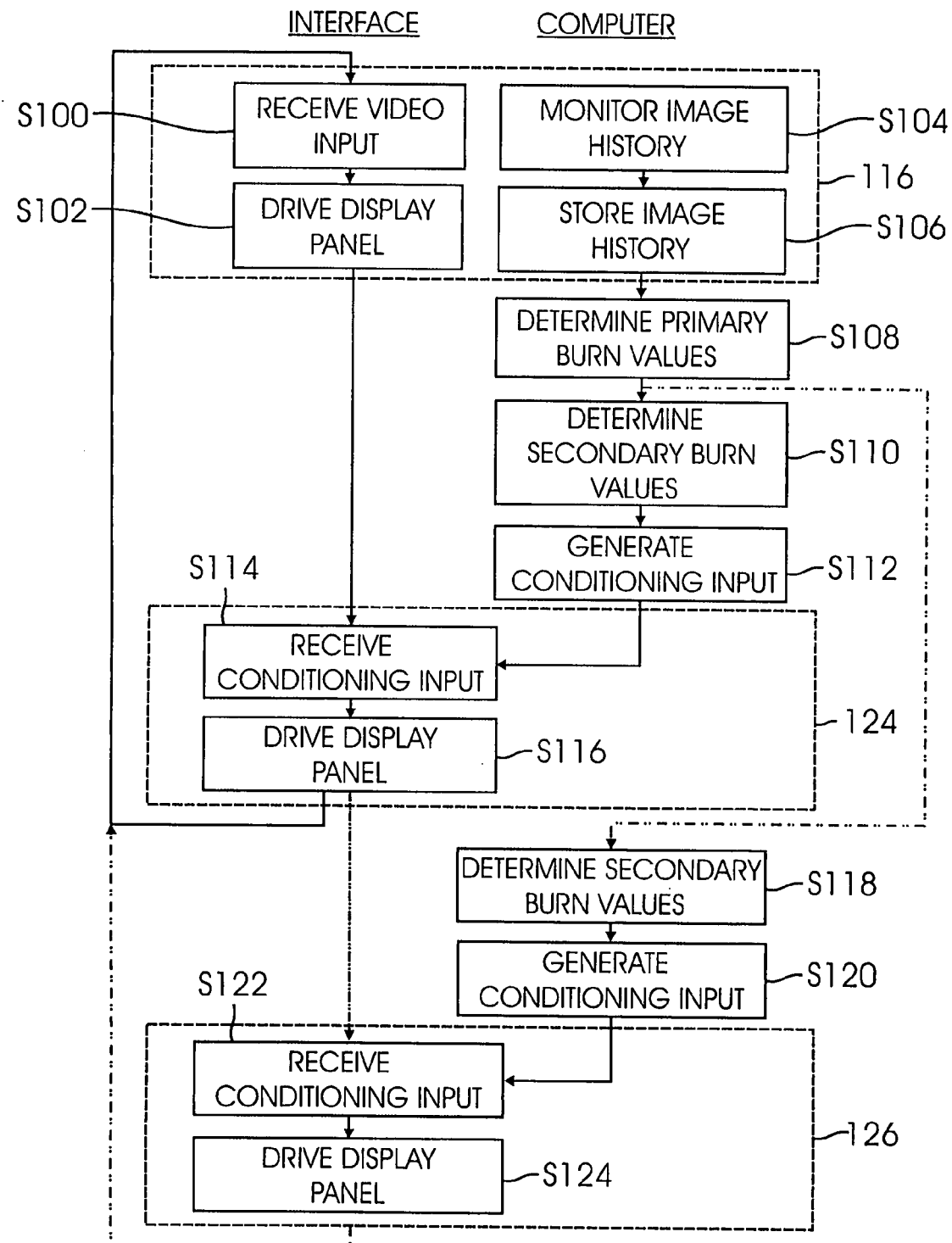
FIG. 3 is a flow chart illustrating an embodiment of a display methodology.

In still other embodiments, the computer 104 may determine a plurality of secondary burn values $B_2(1)$, $B_2(2)$, $B_2(3)$, ..., $B_2(n)$ for each of the pixels 110 such that when a pixel is driven at the secondary burn values $B_2$ for a corresponding plurality of secondary periods of time $\Delta T_2(1)$, $\Delta T_2(2)$, $\Delta T_2(3)$, ..., $\Delta T_2(n)$, an average value of the pixel for the primary and secondary periods of time $\Delta T_1 + \{\Sigma \Delta T_2(i)$ [where i=1 to n]$\}$ is approximately equal to one-half of the bit depth. For example, as shown in FIG. 3, the computer 104 may determine a second set of secondary burn values $B_2$ (S118). Based on this second set of secondary burn values, the computer 104 may generate a corresponding conditioning input (S120) and provide this second conditioning input 122 to the interface 108. Upon receipt (S122), the interface 108 may drive the display panel 106 for a subsequent secondary period of time $\Delta T_2(2)$, or a subsequent reverse burn mode 126.

The cumulative effect of the plurality of reverse burn modes 124, 126 causes the pixels 110 to have a weight average value of one-half of the bit depth which, in an 8-bit embodiment, is 128-128-128. For example, for a RGB display panel, the interface 108 may drive the panel 106 at a duty cycle of 50%(100-200-150)+25%(152-100-100)+25%(160-12-112), where X %=the duty cycle.

Figure 4:
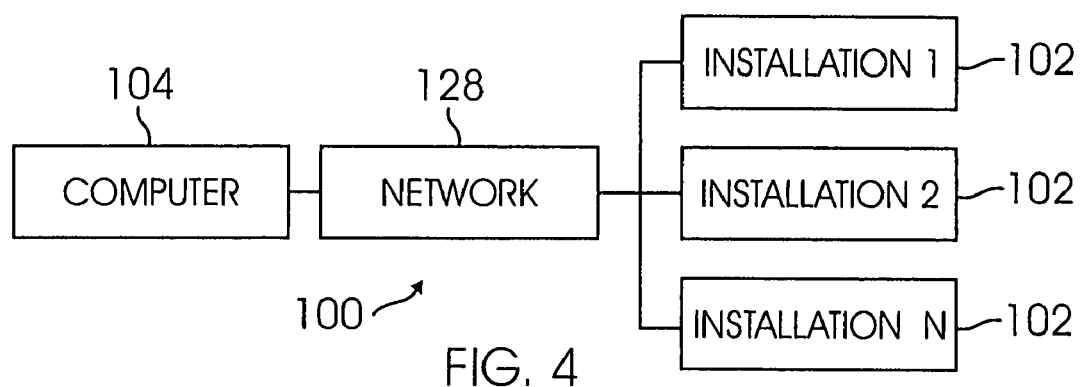
FIG. 4 is a block diagram of a network of display installations.

According to a number of embodiments, a visual display 100 may include a plurality of display installations 102 in communication with the computer 104, for example, via a network 128 such as shown in FIG. 4. In this embodiment, the computer 104 may monitor the image history of each of the display panels 106 independently and responsively condition the panels 106 with respective conditioning inputs.

Regarding the monitoring of the image history (S104), the computer 104 may monitor the drive signal 114 from the interface 108 to the panel display 106. For example, an instantaneous measurement of the drive signal 114 at a given time may be made, with the resulting data stored in the memory 120. In addition, the drive signal 114 may be sampled at a predetermined frequency (e.g., once a second) with the resulting data stored in memory 120.

Figure 5:
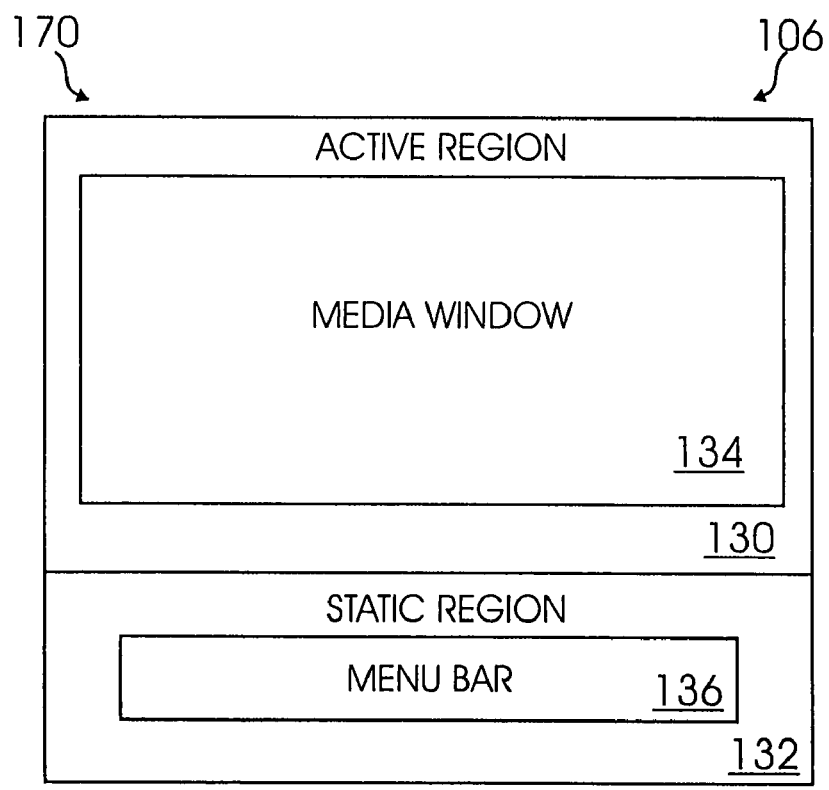
FIG. 5 illustrates a screen layout of an interactive display panel according to a number of embodiments.

With reference to FIG. 5, in still other embodiments, the computer 104 may identify or determine one or more dynamic regions 130 of the display panel 106 and one or more static regions 132 of the panel 106. In this embodiment, the computer 104 may assume that the pixels 110 in the dynamic region 130 operate in a full dynamic range such that the burn-in rate for each of the pixels is approximately the same. Accordingly, the computer 104 may not condition the pixels 110 in the dynamic region 130. On the other hand, the computer 104 may assume that the pixels 110 in the static region 132 operate at a single level during the active burn mode 124, i.e., the primary burn values $B_1$ are generally constant. Accordingly, the computer 104 may implement a reverse burn mode 126 with complementary secondary burn values $B_2$ (e.g., $2^N-B_1$) on a 50% duty cycle. In other embodiments in which the display installation 102 is a public interactive display, the active burn mode 124 may be during regular business hours, while the reverse burn mode 126 may be during "off" hours or when the business is closed (e.g., at night) so as not to interrupt regular operations for panel conditioning.

With continued reference to FIG. 5, display panel 106 may include an interactive plasma display panel (PDP) in which the dynamic region 130 includes a media window 134 and the static region 132 includes a menu bar 136. Accordingly, upon user selection at the menu bar 136, the interface 108 provides a drive signal 114 that displays desired content (e.g., images, graphics, text, etc.) in the media window 134. In some of the embodiments, the media window 134 may displays a "film loop" to allow user navigation. Additionally, the menu bar 136 may display text or icons in fixed or variable positions or messages to call attention to the user that on-demand interactive content is available. This interactive embodiment will be discussed in more detail below.

When the display installation 102 is in normal use during the active burn mode 124, the image-history monitoring process may continue. When the display installation 102 is in the reverse burn mode 126, the data of the image-history database in the memory 120 may be used to determine which of the pixels 110 need to display which colors and for how long in order to effectively reverse or counteract the burn-in effect that has occurred during the active burn mode 124.

Figure 6:
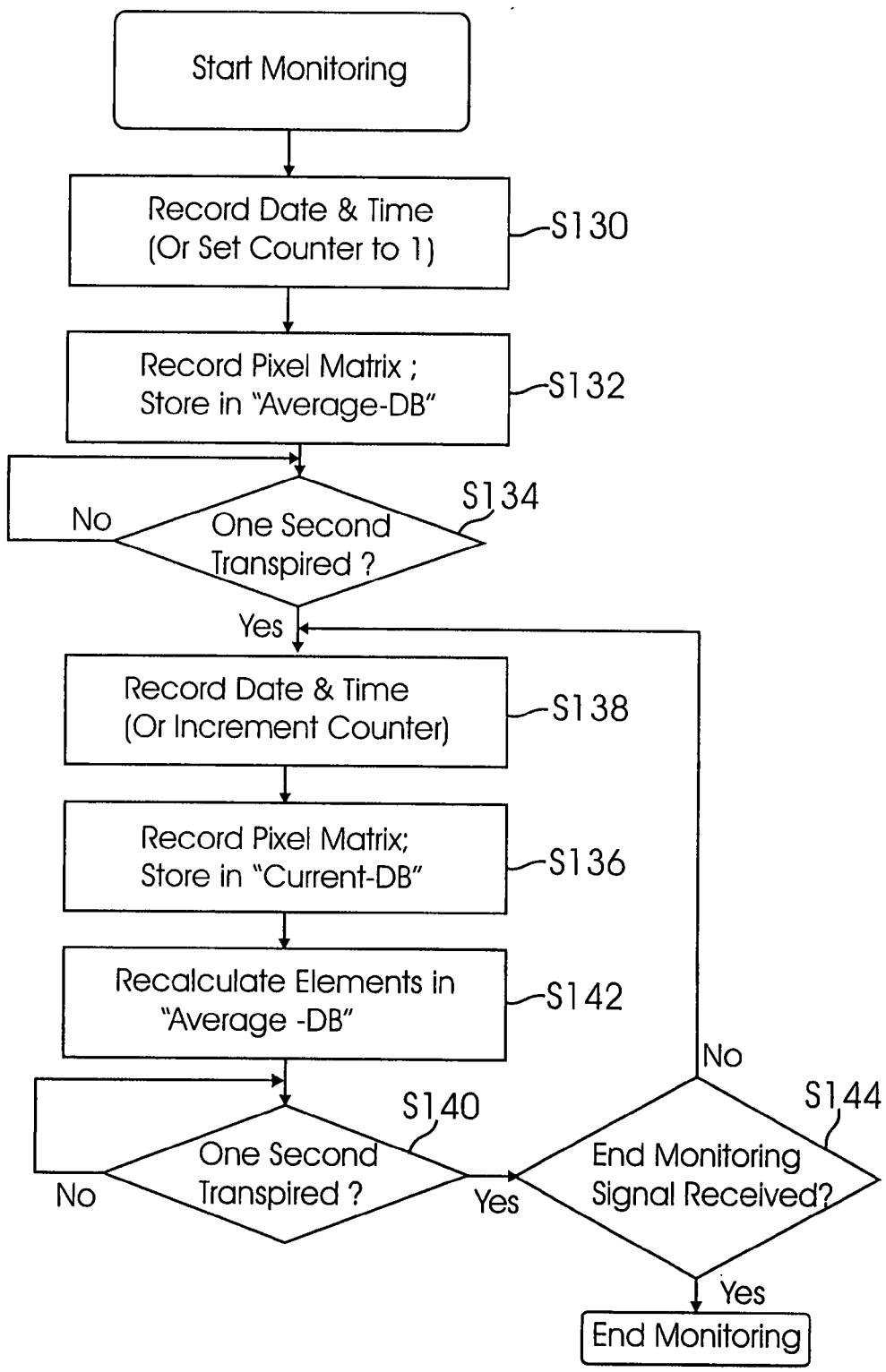
FIG. 6 is a flow chart illustrating methodology for monitoring image history and generating reverse burn values according to some of the embodiments.

One example of the monitoring process is illustrated in FIG. 6. According to this embodiment, two databases 134a and 134b (see FIG. 1) may be used, each with n elements, where n is the total number of pixels 110 on the display panel 106. The first database 134a may be is called an "Average-DB," and the second database 134b may be called a "Current-DB." In addition, the interface 108 may include a display memory 136 in which a pixel matrix is stored. The pixel matrix includes the RGB values of each of the pixels 110 at any given time. Accordingly, the databases 134 may have a structure with n records each with three fields to respectively hold the red, green, and blue color values (e.g., which may be represented by an integer from 0 to 255 for 8-bit embodiments).

Prior to the start of the monitoring process, each database 134 may be set to "empty," i.e., all n values are set to 0, and a counter variable is set to 1 (S130). Alternatively, the date and time may be recorded. At the start of the monitoring process, the computer 104 may record the pixel matrix of the display memory 136 into the first database 134a (S132); accordingly, Average-DB is populated with the RGB values from the display memory 136 at that point in time. After a predetermined amount of time, e.g., one second (S134), the computer 104 may record the display memory 136 and store this data in the second database 134b (S136), i.e., Current-DB, with the counter being incremented by 1 (or, alternatively, the current date and time being recorded) (S138).

During the next cycle period, for example, one second (S140), the contents of Average-DB may be re-calculated (S142). For example, for each color field of each record in Average-DB, the corresponding field in Current-DB and the counter may be used to modify each field in Average-DB according to the formula:

$$NAF=\{[OAF*(C-1)]+CF\}/C,$$

where: NAF is the New value of Average-DB Field;
OAF is the Old value of Average-DB Field;
CF is the Value of Current-DB Field; and C is the Counter value.

Accordingly, this procedure generates an ongoing weighted average for each of the three color components for each pixel 110 of the display panel 106 until an end monitoring signal is received (S144).

Figure 7A:
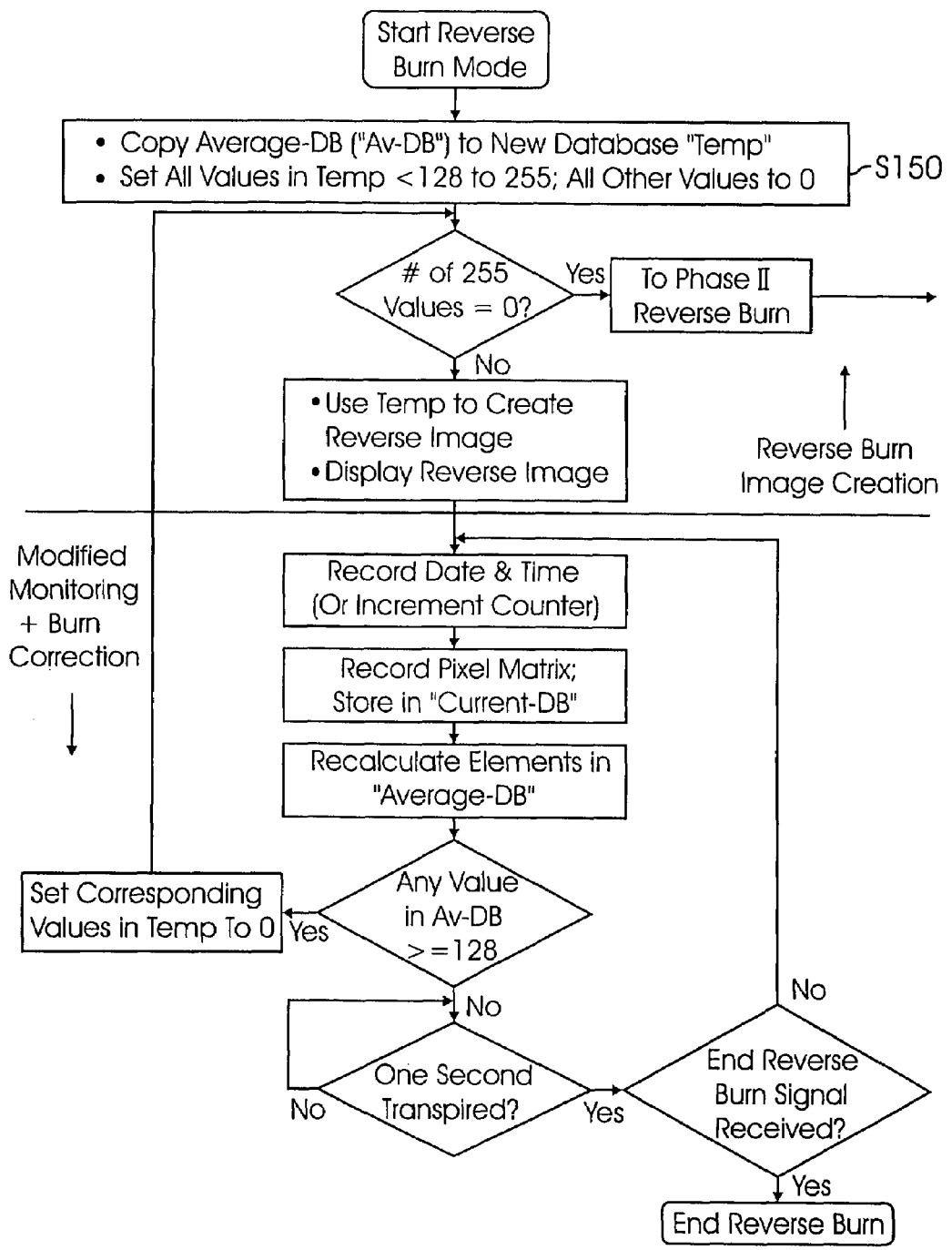
FIGS. 7A and 7B illustrates reverse burn methodology according to still other embodiments of a display panel.
Figure 7B:
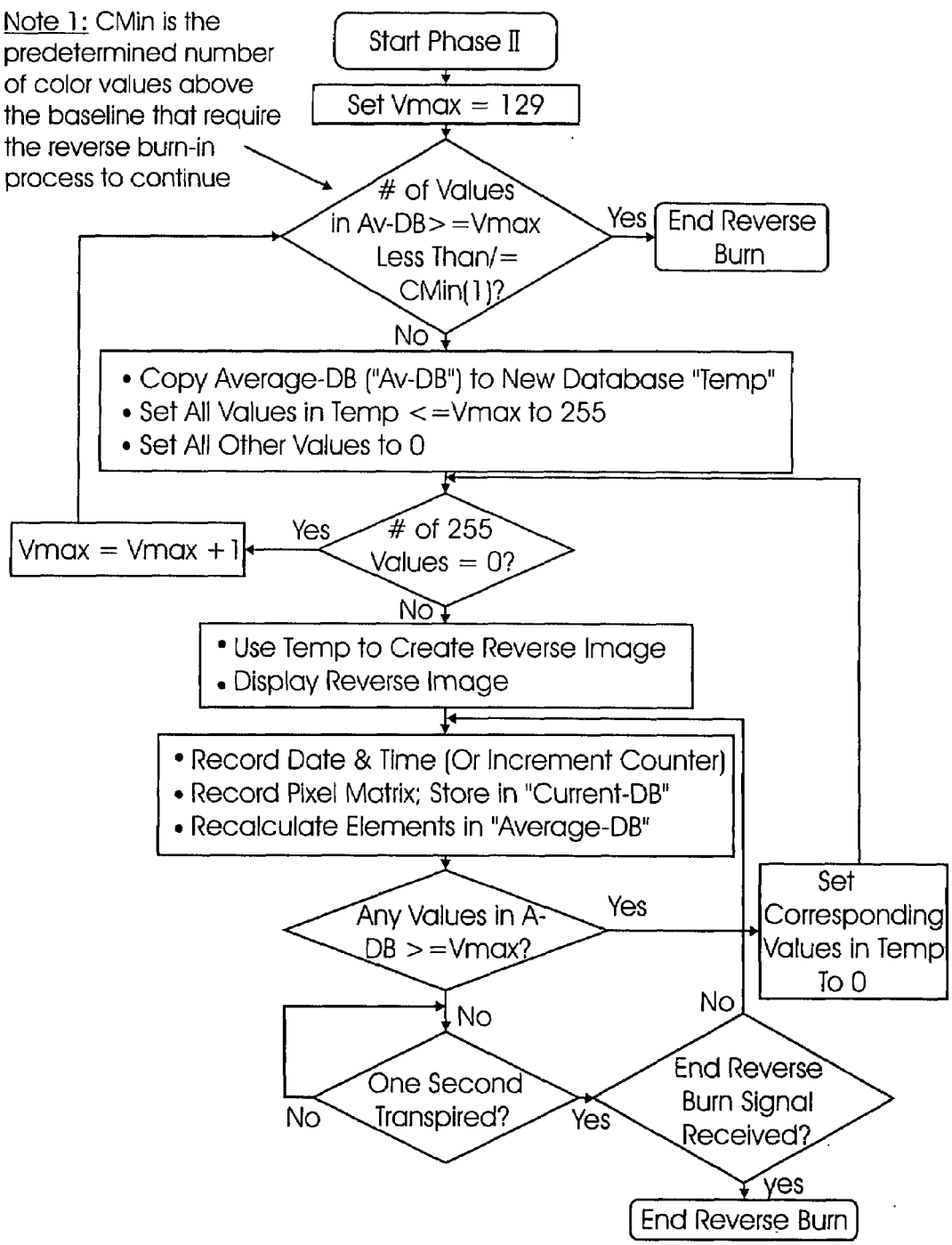

As shown in FIGS. 7A and 7B, when the visual display 100 initiates a reverse burn mode 126, a similar process may be used, except that the image being displayed responsive to the conditioning input 122 is now generated by the computer 104 with the intent to move each pixel 110 towards the one-half bit depth average (e.g., 128-128-128). One example of accomplishing this is to set all of the color values of the pixels 110 whose value in Current-DB is less than $2^N/2$ to $2^N-1$ (e.g., 128 to 255), and to set all of the other color values of the pixels to 0 (S150). To ensure that a pixel 110 is not burned past $2^N/2$ (e.g., 128), the computer 104 may re-check the new Current-DB field for the pixel during each cycle prior to re-setting the field to $2^N-1$ (e.g., 255). According to this methodology, the brightest pixels in the display panel 106 are systematically brought back to a median color image (e.g., 128-128-128) over the full duty cycle.

It is possible that after running the reverse burn process for a period of time, all of the fields of Average-DB are not less than 128, at which point the reverse burn mode 126 may stop. However, some of the field values may now be significantly higher than 128 (indicating a dark spot on the display panel 106). These higher values may then be continued in the reverse burn mode 126. Applying 255 to all of the fields that are now at 128 may gradually increase so that entire set towards the peak value. In this case, care would need to be exercised to ensure that the entire display panel 106 is not unnecessarily run in the reverse burn mode 126 (hence shortening the life expectancy thereof) to bring all fields in sync with a small group of pixels.

In embodiments in which the display panel 106 includes a plasma display panel (PDP), different manufacturers utilize plasma crystals whose burn rate differs between red, green, and blue components. Additionally, some manufacturer's electronics dynamically modify the light intensity of displayed pixels depending on the total light output being displayed. In both cases, the computer 104 may accordingly modify or adjust the weighting of the reverse burn values $B_2$ or the conditioning input 122 to take into account these manufacturing variances.

Figure 10:
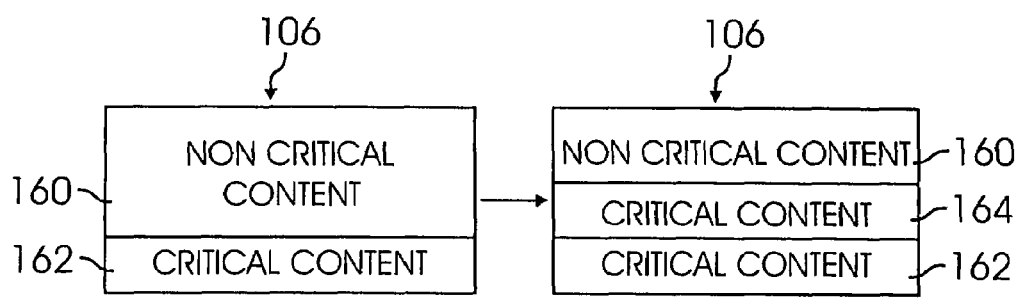
FIG. 10 illustrates a display panel during redeployment of critical content according to some of the embodiments of a display panel.
Figure 16:
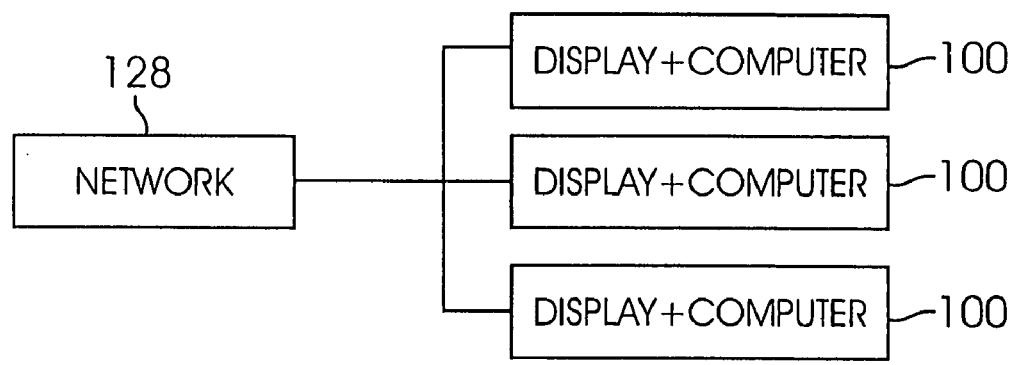
FIG. 16 schematically illustrates an embodiment of a multiple display panel architecture.

According to a number of embodiments, the display panel 106 may include a combination of critical and non-critical content (such as promotional and menu items in a digital menu board application) as illustrated in FIG. 10. In multiple display panel configurations as illustrated in FIG. 16, wherein each display panel 106 may contain critical and non-critical content, the computers can be configured to display critical content normally shown on other displays in the event of a hardware failure affecting one or more of the other displays. In networked embodiments as shown in FIG. 4, the computer 104 may control the operation of a plurality of the display panels 106. Accordingly, the computer 104 may control critical content as well as non-critical promotional content. Further, the computer 104 may be configured to display all critical content on a single display panel 106, or a number of display panels 106 that is less than the total number N of display installations 102.

In addition, in the event of a hardware failure of one of the display installations (1, 2, . . . , N) 102, the computer 104 may redeploy critical content onto the display panel 106 of a surviving display installation 102. The computer 104 may utilize a standard interface mode and alternate interface mode(s) in conjunction with peer-to-peer polling mechanisms to trigger the redeployment event.

With continued reference to FIGS. 1 and 4, to identify the failure of one or more display panels 106, according to some of the embodiments, the computer 104 controls and monitors each display installation 106 remotely through the network 128, such as a wide area network (WAN). If there is a hardware failure during a period of no WAN connection, then the computer 104 may not be capable of automated recovery and redeployment of critical content. Accordingly, a peer-to-peer polling system may be implemented.

Figure 9:
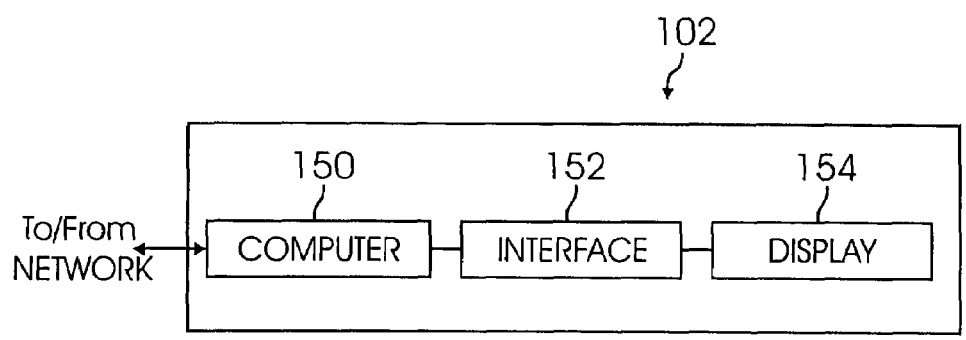
FIG. 9 is a block diagram illustrating a display installation according to a number of embodiments.

In this embodiment, each of the display installations 102 may include a computer 150, an interface 152, and a display panel 154 as shown in FIG. 9. Each computer 150 in the array of installations 102 may then periodically try to establish contact with one or all of the other computers 150. In the event that contact cannot be established, then the computer 150 assumes that the installation 102 with which contact cannot be established has experienced a hardware failure. Accordingly, the computer 104 may then trigger an appropriate alternate layout and redeployment of critical content from the nonfunctional display installation 102.

In other embodiments, the computer 104 may automatically change a display layout of one of the display panels of one of the functioning installations 102 to include the critical content of the nonfunctioning installation. For example, with reference to FIGS. 4 and 10, the display layout of a functioning panel 106 includes noncritical content 160 and critical content 162. When critical content from a nonfunctioning panel is redeployed to the functioning panel 106, then the computer 104 may reduce or eliminate the noncritical content 160 and add critical content 164 from the nonfunctioning display.

Figure 8:
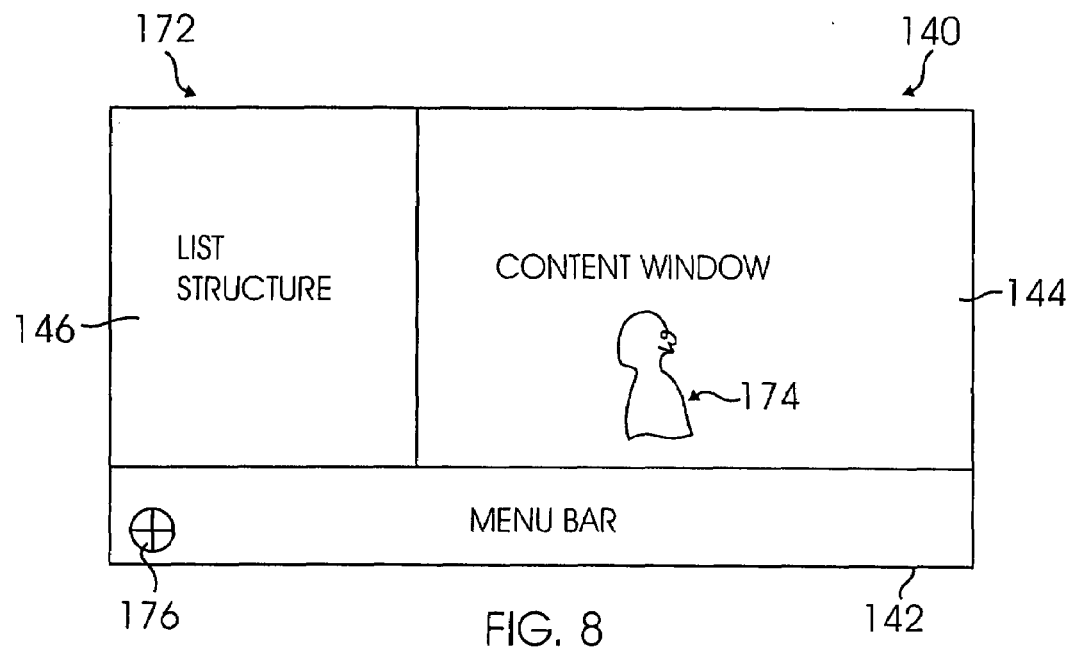
FIG. 8 illustrates a screen layout for an interactive display panel according to other embodiments.

As mentioned above, according to a number of embodiments, the display panel 106 may include an interactive display panel 140, an example of which is illustrated in FIG. 8. The interactive display panel 140 may include a menu bar 142, a content window 144, and a list structure 146. With further reference to FIG. 8, the three-part partition of the display panel 140 including the menu bar 142, the content window 144, and the list structure 146 may be used in the Default Screen in a number of embodiments. Accordingly, throughout a decision tree sequence, the same three-partition format may be used to reduce confusion for the user and lead to simpler navigation. In wayfinding applications, the content window 144 may display animated maps that visually maps out a path from the current location of the use to the selected location, thereby significantly enhancing the wayfinding functionality of the panel 140.

According to still other embodiments, navigation may be further enhanced by introducing feedback/guidance mechanisms throughout navigation of the decision tree. For example, the computer 104 may employ audio and/or visual indicators to reinforce the current location in the decision tree and guide the user on to the next step in the process. In addition, the computer 104 may utilize the content window 144 to display "next step" visual prompts (that is, "Visual Navigation Enhancement," elements or VNE) in conjunction with relevant audio prompts to guide the user. Categories of VNE elements can be stored and called by the user interface depending on the type of information being displayed and where the user is located within the decision tree structure. For example, a generic "select a store from the list" audio prompt may be one such audio prompt that may coincide with a VNE element. In further embodiments, the VNE element may include a computer animated figure that virtually guides the user on to the next step.

Figure 11:
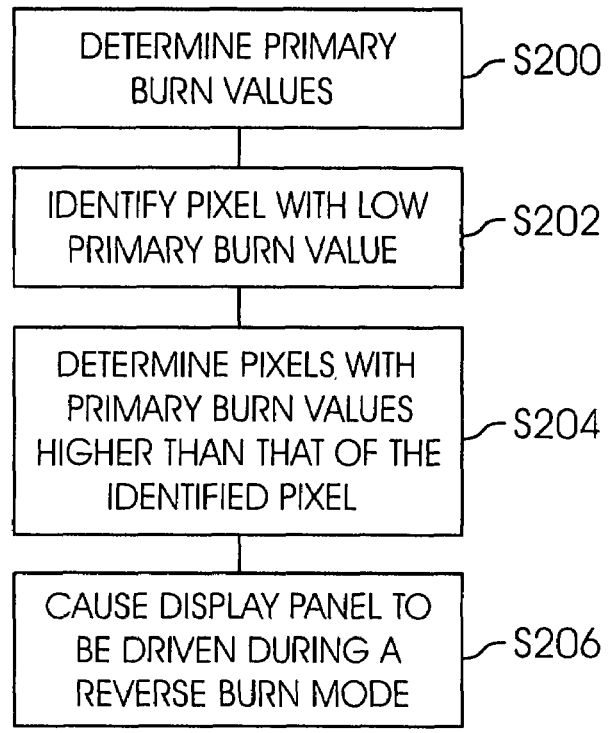
FIG. 11 illustrates methodology for operating a display panel according to a number of embodiments.

With reference to FIG. 11, in other embodiments, the computer 104 may control or operate a display panel 106 by first determining a primary burn value $B_1$ for each of the pixels 110 for the active burn mode 116 (S200). The computer 104 may then identify one of the pixels 110 that has a low primary burn value $B_1$ (S202). A pixel 110 having a low primary burn value, e.g., 10-20-10 in an 8-bit embodiment, indicates that the pixel 110 has been burned at a greater degree than pixels having a higher primary burn value, e.g., 180-200-230. The computer 104 may then determine a number of pixels 110 that have primary burn values $B_1$ higher than the low primary burn value (S204), thus indicating that these pixels have been burned at a lesser degree than the identified pixel with the low burn value. The computer 104 may then cause the interface 108 to drive the display panel 106 during a reverse burn mode (S206) such that the pixels having a primary burn value $B_1$ higher than the low primary burn value of the identified pixel are burned to reduce the respective differences between higher primary burn values and the low primary burn value.

According to a number of embodiments, the low primary burn value B1 of the identified pixel may be the lowest value of the primary burn values B1 determined by the computer 104, such that the identified pixel has been burned at the greatest degree out of any of the pixels 110 of the display panel 106 during the active burn mode 116. For the purposes of this description, the term "burn" indicates to activate, operate, or drive a pixel with a drive value or a plurality of drive values for a period of time. In color applications, the drive value may include a plurality of color values (e.g., RGB).

In addition, each of the pixels 110 has a difference between the primary burn value $B_1$ thereof and the low primary burn value $B_1$ of the identified pixel 110. The computer 104 may then cause the interface to drive the display panel 106 during the reverse burn mode 124 such that each of the pixels 110 is burned to reduce the difference between the primary burn value thereof and the low primary burn value of the identified pixel.

Figure 12:
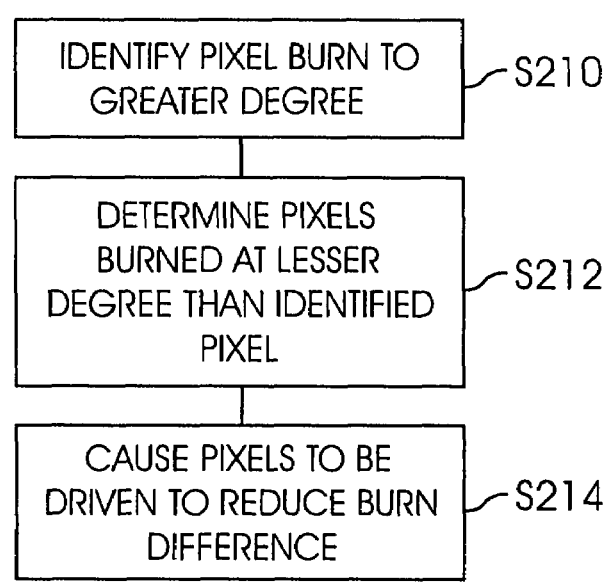
FIG. 12 illustrates methodology for operating a display panel according to other embodiments.

Referring to FIG. 12, in still other embodiments the computer 104 may control the display panel 106 by monitoring an image history of the pixels 110 during the active burn mode 116 and then identifying a pixel 110 that has been burned at a greater degree than a number of other pixels (S210). The computer 104 may then determine a number of pixels that have been burned at a lesser degree than the identified pixel (S212). The computer 104 may then causing the display panel 106 to be driven during the reverse burn mode 124 such that the number of pixels that have been burned at a lesser degree are burned to reduce the burn difference between each of the number of pixels and the identified pixel (S214). The burn difference may be defined as the difference in magnitude of the primary burn values between the identified pixel and the other pixels 110 of the panel 106.

With further reference to FIG. 1, according to a number of embodiments, a burn-in recovery system of the display system includes the computer 104 and an image monitoring software program stored in the memory 120. The software program maintains ongoing image history and uses the image history to generate new images for presentation on the display panel 106 which reverse the burn-in process. The computer 104 may generate reverse burn images programmatically so that the reverse burn image is continuously modified based on the current ongoing image history.

With further reference to FIGS. 5 and 8, according to a number of embodiments, a zero-burn user interface 170 (FIG. 5) and 172 (FIG. 8) for a display panel 106 and 140 is illustrated, such as a plasma display panel. The display panels 106 and 140 are susceptible to burn-in of static and pseudo-static images. As mentioned above, user interfaces 170 include a static or pseudo-static area 132, and user interface 172 includes a static or pseudo-static area 142. The user interface 170, 172 utilizes dynamic color sets having a weighted average of 128-128-128 in static areas 132, 142. The weighted average may be based on duty cycle, variations in color burn rates, modifications of color or intensity by display electronics prior to rendering on the display, or any combination thereof.

With particular reference to FIG. 5, according to other embodiments, the interactive user interface 170 may include Default Screen that includes only the media window 134 and the menu bar 136. In some of the embodiments, the media window 134 may make up at least 75% of the surface area of the display panel 106. In these embodiments, the display panel 106 may be used as a public information system, for example, in a commercial building.

With particular reference to FIG. 8, the interactive user interface 172 may include a Content Screen that includes only the menu bar 142, the content window 144, and the list structure 146. In some of these embodiments, the content window 144 may make up at least 75% of the surface area of the display panel 140. These embodiments of the invention may be implemented as a public information system, for example, in a commercial building. In other embodiments, the Content Screen of the interactive user interface 172 may be used to display animated wayfinding maps.

As mentioned above, the interactive user interface 172 may utilize the Content Screen to display visual navigation enhancement (VNE) during decision tree navigation. For example, the visual navigation enhancement may be accomplished via a 3D virtual guide 174. The user interface 172 may include a speaker 176 so that may the virtual guide 174 may include audio coupled to animated speech. In addition, the 3D virtual guide may speak in multiple languages. In these embodiments, the speech may be generated by text-to-speech software. These embodiments may also be implemented as public information systems.

Referencing FIGS. 1 and 4, the computer 104 may be configured to perform fault-tolerant control of the display panel 106 of a plurality of display installations 102. As mentioned above, a fault-tolerant multiple-display architecture automatically redeploys critical content onto adjacent surviving display panels 106 using peer-to-peer polling to trigger the conversion or redeployment. In these embodiments, the visual display 100 may be implemented as a Digital Menu Board, for example, in a restaurant.

Figure 13:
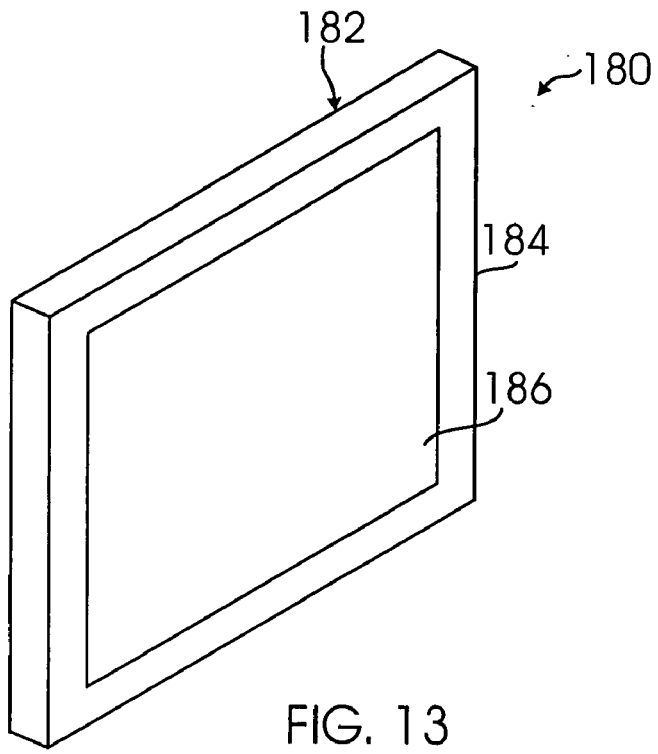
FIG. 13 is a perspective view of a visual network appliance of a display panel.
Figure 14:
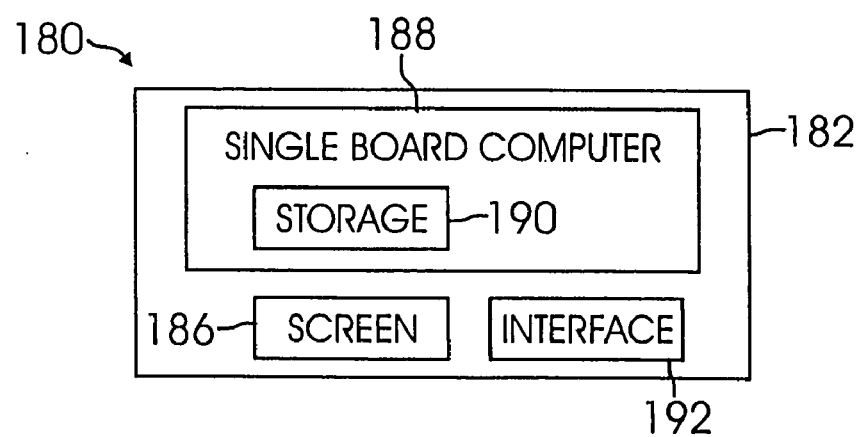
FIG. 14 is a block diagram of the visual network appliance.

With reference to FIGS. 13 and 14, a visual network appliance 180 for use in digital menu board applications may include a thin, self-contained display unit 182 including a housing 184 characterized by a length, a width, and a depth. The visual network appliance 180 may include a large-format video display screen 186 and a single board computer 188 including a large-capacity mass data storage unit 190. In a number of embodiments, the single board computer 188 is contained within the housing 184. The appliance 180 may also include a network communications interface 192. According to some of the embodiments, a display image may be transferred from the storage 190 of the single board computer 188 directly to the screen 186 in digital format without first being converted to an analog signal.

Figure 15:
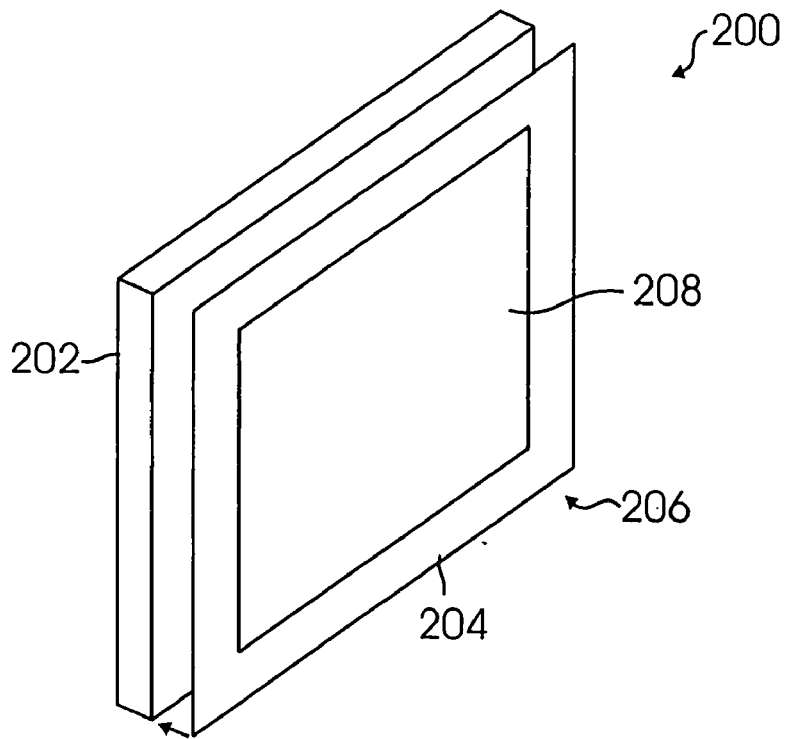
FIG. 15 schematically illustrates an interactive digital ad board.

Referencing FIG. 15, in another embodiment a large-format interactive digital ad board 200 may be used in the display panel and includes a large-format video display screen 202 and a touch panel 204 dimensioned to fit over the video display screen. In addition, a user interface 206 includes a Default Screen that includes predominantly a media window 208. Accordingly, on-demand information may be made available on the display screen 202 upon request of a user by a user accessing the ad board 200 through the touch panel 204.

Those skilled in the art will understand that the preceding embodiments of the display panel provide the foundation for numerous alternatives and modifications thereto. These other modifications are also within the scope of the present invention. Accordingly, the display panel is not limited to that precisely as shown and described in the present application.

What is claimed is:

1. A visual display comprising:
   a display installation including:
      a display panel including a plurality of pixels each having a bit depth; and
      an interface in communication with the display panel for receiving a video input and for driving the display panel during an active burn mode; and a computer in communication with the display installation for:
   determining a primary burn value for each of the pixels for the active burn mode;
   identifying a pixel having a low primary burn value indicating that the identified pixel has been burned at a greater degree than a number of other pixels; and
   determining a number of pixels each having a primary burn value higher than the low primary burn value indicating that the number of pixels have been burned at a lesser degree than the identified pixel;
   wherein the computer causes the interface to drive the display panel during a reverse burn mode such that the number of pixels having a primary burn value higher than the low primary burn value are burned to reduce the respective differences between higher primary burn values and the low primary burn value.

2. The visual display of claim 1 wherein each of the pixels other than the identified pixel has a difference between the primary burn value thereof and the low primary burn value of the identified pixel; the computer causing the display panel to be driven during a reverse burn mode such that each of the pixels other than the identified pixel is burned to reduce the difference.

3. The visual display of claim 1 wherein the computer determines a secondary burn value for each of the pixels such that when a pixel is driven at the secondary burn value thereof during a reverse burn mode, an average value of the pixel for the active and reverse burn modes is approximately equal to one-half of the bit depth of the pixel.

4. The visual display of claim 3 wherein the computer determines a plurality of secondary burn values for each of the pixels such that when a pixel is driven at the secondary burn values for a corresponding plurality of reverse burn modes, an average value of the pixel for the active and reverse burn modes is approximately equal to one-half of the bit depth.

5. The visual display of claim 3 wherein the interface drives. the display panel with the secondary burn values during the reverse burn mode.

6. The visual display of claim 3 wherein the interface drives the display panel such that each of the pixels is driven at a plurality of drive values during the active burn mode; the primary burn value of each pixel being approximately equal to an average value of the drive values of the pixel for the active burn mode.

7. The visual display of claim 6 wherein the secondary burn value of each pixel is approximately equal to the difference between the bit depth and the average value.

8. The visual display of claim 3 wherein each of the pixels has a color set including a plurality of color values each having a bit depth; the computer determining a primary burn value and a secondary burn value for each of the color values of the color set.

9. The visual display of claim 8 wherein:
the plurality of color values includes red, green, and blue, each of which having a bit depth of 256; and
a weighted average of the primary and the secondary burn values, for the color set for the active and reverse burn modes, is approximately equal to 128-128-128.

10. The visual display of claim 1 wherein the computer monitors an image history of the display panel in determining the primary burn values.

11. The visual display of claim 1 wherein the display installation includes a plasma display panel.

12. The visual display of claim 1 further comprising a plurality of the display installations in communication with the computer.

13. A method for controlling a display panel including a plurality of pixels each having a bit depth, the method comprising:
monitoring an image history of the pixels during an active burn mode;
determining a primary burn value for each of the pixels during the active burn mode;
determining a secondary burn value for each of the pixels such that when a pixel is driven at the secondary burn value thereof for a reverse burn mode, an average value of the pixel during the active and reverse burn modes is approximately equal to one-half of the bit depth of the pixel;
generating a conditioning input based on the secondary burn values: and
providing the conditioning input to an interface to drive the display panel.

14. A method for controlling a display panel including a plurality of pixels each having a bit depth, the display panel being driven to display content during an active burn mode, the method comprising:
monitoring an image history of the pixels during the active burn mode;
determining a primary burn value for each of the pixels for the active burn mode;
identifying a pixel having a low primary burn value indicating that the identified pixel has been burned at a greater degree than a number of other pixels; and
determining a number of pixels each having a primary burn value higher than the low primary burn value indicating that the number of pixels have been burned at a lesser degree than the identified pixel;
causing the display panel to be driven during a reverse burn mode such that the number of pixels having a primary burn value higher than the low primary burn value are burned to reduce the respective differences between higher primary burn values and the low primary burn value.

15. A method for use with a display panel having a plurality of pixels, the method comprising:
determining a first primary value for a first pixel of the plurality of pixels during a primary period of time, based on displaying a video input on the display panel;
determining a second primary value for a second pixel of the plurality of pixels during the primary period of time, based on displaying the video input on the display panel;
determining a third primary value for a third pixel of the plurality of pixels during the primary period of time, based on displaying the video input on the display panel;
determining that the third primary value of the third pixel is lower than each of the first primary value of the first pixel and the second primary value of the second pixel;
calculating a first secondary value for the first pixel of the plurality of pixels to be applied during a secondary period of time;
calculating a second secondary value for the second pixel of the plurality of pixels to be applied during the secondary period of time;
generating a conditioning input, based on the first secondary value and the second secondary value, to be displayed on the display panel during the secondary period of time;
displaying the conditioning input on the display panel for the secondary period of time to reduce a difference between a light output of the first pixel and a light output of the second pixel resulting from displaying the video input on the first pixel and the second pixel of the display panel;
wherein the first secondary value for the first pixel is based on a difference between the third primary value for the third pixel and the first primary value for the first pixel, and the second secondary value for the second pixel is based on a difference between the third primary value for the third pixel and the second primaiy value for the second pixel.

16. The method of claim 15, wherein the primary period of time is equal to the secondary period of time.

17. The method of claim 15, wherein the primary period of time is not equal to the secondary period of time.

18. The method of claim 15, wherein the first secondary value for the first pixel and the secondary period of time are calculated such that an average value of the first pixel for the primary period of time and the secondary period of time is approximately equal to one-half of a bit depth of the first pixel.

19. The method of claim 18, wherein the second secondary value for the second pixel is calculated such that an average value of the second pixel for the primary period of time and the secondary period of time is approximately equal to one-half of a bit depth of the second pixel.

20. The method of claim 15, wherein the determining the first primary value for the first pixel includes monitoring an image history based on the video input during the primaiy period of time.

21. The method of claim 20 further comprising storing the image history.

22. The method of claim 20, wherein the video input is sampled at a predetermined frequency.

23. The method of claim 20 further comprising:
generating a database of cumulative average pixel values based on the image history.

24. The method of claim 23, wherein the database includes a cumulative average value for each of color components of each of the plurality of pixels.

25. The method of claim 15, wherein the determining the first primary value for the first pixel is further based on manufacturing parameters of the display panel.

26. The method of claim 15 further comprising:
determining a dynamic region of the display panel displaying the video input;
determining a static region of the display panel displaying the video input;
wherein the first pixel and the second pixel are located in the static region.

27. The method of claim 26, wherein the displaying of the conditioning input occurs on the static region of the display panel only.

28. A device for use with a display panel having a plurality of pixels, the device comprising:
a processor; and
a memory including a software program for execution by the processor to perform:
determining a first primary value for a first pixel of the plurality of pixels during a primary period of time, based on displaying a video input on the display panel;
determining a second primary value for a second pixel of the plurality of pixels during the primary period of time, based on displaying the video input on the display panel;
determining a third primary value for a third pixel of the plurality of pixels during the primary period of time, based on displaying the video input on the display panel;
determining that the third primary value of the third pixel is lower than each of the first primary value of the first pixel and the second primary value of the second pixel;
calculating a first secondary value for the first pixel of the plurality of pixels to be applied during a secondary period of time;
calculating a second secondary value for the second pixel of the plurality of pixels to be applied during the secondary period of time;
generating a conditioning input, based on the first secondary value and the second secondary value, to be displayed on the display panel during the secondary period of time;
displaying the conditioning input on the display panel for the secondary period of time to reduce a difference between a light output of the first pixel and a light output of the second pixel resulting from displaying the video input on the first pixel and the second pixel of the display panel;
wherein the first secondary value for the first pixel is based on a difference between the third primary value for the third pixel and the first primary value for the first pixel, and the second secondary value for the second pixel is based on a difference between the third primary value for the third pixel and the second primary value for the second pixel.

29. The device of claim 28, wherein the primary period of time is equal to the secondary period of time.

30. The device of claim 28, wherein the primary period of time is not equal to the secondary period of time.

31. The device of claim 28, wherein the first secondary value for the first pixel and the secondary period of time are calculated such that an average value of the first pixel for the primary period of time and the secondary period of time is approximately equal to one-half of a bit depth of the first pixel.

32. The device of claim 31, wherein the second secondary value for the second pixel is calculated such that an average value of the second pixel for the primary period of time and the secondary period of time is approximately equal to one-half of a bit depth of the second pixel.

33. The device of claim 28, wherein the determining the first primary value for the first pixel includes monitoring an image history based on the video input during the primary period of time.

34. The device of claim 33, wherein the memory includes the software program for execution by the processor to perform: storing the image history.

35. The device of claim 33, wherein the video input is sampled at a predetermined frequency.

36. The device of claim 33, wherein the memory includes the software program for execution by the processor to perform: generating a database of average pixel values based on the image history.

37. The device of claim 36, wherein the database includes an average value for each of color components of each of the plurality of pixels.

38. The device of claim 28, wherein the determining the first primary value for the first pixel is further based on manufacturing parameters of the display panel.

39. The device of claim 28, wherein the memory includes the software program for execution by the processor to perform:
determining a dynamic region of the display panel displaying the video input;
determining a static region of the display panel displaying the video input;
wherein the first pixel and the second pixel are located in the static region.

40. The device of claim 39, wherein the displaying of the conditioning input occurs on the static region of the display panel only.

41. A display apparatus comprising:
a display panel having a plurality of pixels; and
a processor, wherein the processor is configured to:
determine a first primary value for a first pixel of the plurality of pixels during a primaty period of time, based on displaying a video input on the display panel;
determine a second primary value for a second pixel of the plurality of pixels during the primary period of time, based on displaying the video input on the display panel;
determine a third primary value for a third pixel of the plurality of pixels during the primary period of time, based on displaying the video input on the display panel;
determine that the third primary value of the third pixel is lower than each of the first primary value of the first pixel and the second primary value of the second pixel;
calculate a first secondary value for the first pixel of the plurality of pixels to be applied during a secondary period of time;
calculate a second secondary value for the second pixel of the plurality of pixels to be applied during the secondary period of time;

generate a conditioning input, based on the first secondary value and the second secondary value, to be displayed on the display panel during the secondary period of time;

display the conditioning input on the display panel for the secondary period of time to reduce a difference between a light output of the first pixel and a light output of the second pixel resulting from displaying the video input on the first pixel and the second pixel of the display panel;

wherein the first secondary value for the first pixel is based on a difference between the third primary value for the third pixel and the first primary value for the first pixel, and the second secondary value for the second pixel is based on a difference between the third primary value for the third pixel and the second primary value for the second pixel.

42. The display apparatus of claim 41 further comprising an interface configured to drive the plurality of pixels using the video input.

43. The display apparatus of claim 41, wherein the primary period of time is equal to the secondary period of time.

44. The display apparatus of claim 41, wherein the first secondary value for the first pixel and the secondary period of time are calculated such that an average value of the first pixel for the primary period of time and the secondary period of time is approximately equal to one-half of a bit depth of the first pixel.

45. The display apparatus of claim 44, wherein the second secondary value for the second pixel is calculated such that an average value of the second pixel for the primary period of time and the secondary period of time is approximately equal to one-half of a bit depth of the second pixel.

46. The display apparatus of claim 41, wherein determining the first primary value for the first pixel includes monitoring an image history based on the video input during the primary period of time.

47. The display apparatus of claim 46, wherein the processor is further configured to store the image history.

48. The display apparatus of claim 46, wherein the video input is sampled at a predetermined frequency.

49. The display apparatus of claim 46, wherein the processor is further configured to:

generate a database of cumulative average pixel values based on the image history.

50. The display apparatus of claim 49, wherein the database includes a cumulative average value for each of color components of each of the plurality of pixels.

51. The display apparatus of claim 41, wherein determining the first primary value for the first pixel is further based on manufacturing parameters of the display panel.

52. The display apparatus of claim 41, wherein the processor is further configured to:

determine a dynamic region of the display panel displaying the video input;

determine a static region of the display panel displaying the video input;

wherein the first pixel and the second pixel are located in the static region.

53. The display apparatus of claim 52, wherein the processor displays the conditioning input on the static region of the display panel only.

54. A method for use with a display panel having a plurality of pixels, the method comprising:

determining a first primary value for a first pixel of the plurality of pixels during a primary period of time, based on displaying a video input on the display panel, wherein determining the first primary value for the first pixel includes monitoring an image history based on the video input during the primaty period of time;

determining a second primary value for a second pixel of the plurality of pixels during the primary period of time, based on displaying the video input on the display panel;

calculating a first secondary value for the first pixel of the plurality of pixels to be applied during a secondary period of time;

calculating a second secondary value for the second pixel of the plurality of pixels to be applied during the secondary period of time;

generating a conditioning input, based on the first secondary value and the second secondary value, to be displayed on the display panel during the secondary period of time;

generating a database of cumulative average pixel values based on the image history;

displaying the conditioning input on the display panel for the secondary period of time to reduce a difference between a light output of the first pixel and a light output of the second pixel resulting from displaying the video input on the first pixel and the second pixel of the display panel.

55. The method of claim 54, wherein the database includes a cumulative average value for each of color components of each of the plurality of pixels.

56. A method for use with a display panel having a plurality of pixels, the method comprising:

determining a first primary value for a first pixel of the plurality of pixels during a primary period of time, based on displaying a video input on the display panel, wherein determining the first primary value for the first pixel is further based on manufacturing parameters of the display panel;

determining a second primary value for a second pixel of the plurality of pixels during the primary period of time, based on displaying the video input on the display panel;

calculating a first secondary value, for the first pixel of the plurality of pixels to be applied during a secondary period of time;

calculating a second secondary value for the second pixel of the plurality of pixels to be applied during the secondary period of time;

generating a conditioning input, based on the first secondary value and the second secondary value, to be displayed on the display panel during the secondary period of time;

displaying the conditioning input on the display panel for the secondary period of time to reduce a difference between a light output of the first pixel and a light output of the second pixel resulting from displaying the video input on the first pixel and the second pixel of the display panel.

57. A method for use with a display panel having a plurality of pixels, the method comprising:

determining a dynamic region of the display panel displaying a video input;

determining a static region of the display panel displaying the video input;

determining a first primary value for a first pixel of the plurality of pixels during a primary period of time, based on displaying the video input on the display panel;

determining a second primary value for a second pixel of the plurality of pixels during the primary period of time, based on displaying the video input on the display panel, wherein the first pixel and the second pixel are located in the static region;

calculating a first secondary value for the first pixel of the plurality of pixels to be applied during a secondary period of time;

calculating a second secondary value for the second pixel of the plurality of pixels to be applied during the secondary period of time;

generating a conditioning input, based on the first secondary value and the second secondary value, to be displayed on the display panel during the secondary period of time;

displaying the conditioning input on the display panel for the secondary period of time to reduce a difference between a light output of the first pixel and a light output of the second pixel resulting from displaying the video input on the first pixel and the second pixel of the display panel.

58. The method of claim 57, wherein the displaying of the conditioning input occurs on the static region of the display panel only.

59. A device for use with a display panel having a plurality of pixels, the device comprising:
a processor; and
a memory including a software program for execution by the processor to perform:
determining a first primary value for a first pixel of the plurality of pixels during a primary period of time, based on displaying a video input on the display panel, wherein determining the first primary value for the first pixel includes monitoring an image history based on the video input during the primary period of time;
determining a second primary value for a second pixel of the plurality of pixels during the primary period of time, based on displaying the video input on the display panel;
calculating a first secondary value for the first pixel of the plurality of pixels to be applied during a secondary period of time;
calculating a second secondary value for the second pixel of the plurality of pixels to be applied during the secondary period of time;
generating a conditioning input, based on the first secondary value and the second secondary value, to be displayed on the display panel during the secondary period of time;
generating a database of average pixel values based on the image history;
displaying the conditioning input on the display panel for the secondary period of time to reduce a difference between a light output of the first pixel and a light output of the second pixel resulting from displaying the video input on the first pixel and the second pixel of the display panel.

60. The device of claim 59, wherein the database includes an average value for each of color components of each of the plurality of pixels.

61. A device for use with a display panel having a plurality of pixels, the device comprising:
a processor; and
a memory including a software program for execution by the processor to perform:
determining a first primary value for a first pixel of the plurality of pixels during a primary period of time, based on displaying a video input on the display panel, wherein determining the first primary value for the first pixel is further based on manufacturing parameters of the display panel;
determining a second primary value for a second pixel of the plurality of pixels during the primary period of time, based on displaying the video input on the display panel;
calculating a first secondary value for the first pixel of the plurality of pixels to be applied during a secondary period of time;
calculating a second secondary value for the second pixel of the plurality of pixels to be applied during the secondary period of time;
generating a conditioning input, based on the first secondary value and the second secondary value, to be displayed on the display panel during the secondary period of time;
displaying the conditioning input on the display panel for the secondary period of time to reduce a difference between a light output of the first pixel and a light output of the second pixel resulting from displaying the video input on the first pixel and the second pixel of the display panel.

62. A device for use with a display panel having a plurality of pixels, the device comprising:
a processor; and
a memory including a software program for execution by the processor to perform:
determining a dynamic region of the display panel displaying the video input;
determining a static region of the display panel displaying the video input;
determining a first primary value for a first pixel of the plurality of pixels during a primary period of time, based on displaying the video input on the display panel;
determining a second primary value for a second pixel of the plurality of pixels during the primary period of time, based on displaying the video input on the display panel, wherein the first pixel and the second pixel are located in the static region;
calculating a first secondary value for the first pixel of the plurality of pixels to be applied during a secondary period of time;
calculating a second secondary value for the second pixel of the plurality of pixels to be applied during the secondaxy period of time;
generating a conditioning input, based on the first secondary value and the second secondary value, to be displayed on the display panel during the secondary period of time;
displaying the conditioning input on the display panel for the secondary period of time to reduce a difference between a light output of the first pixel and a light output of the second pixel resulting from displaying the video input on the first pixel and the second pixel of the display panel.

63. The device of claim 62, wherein the displaying of the conditioning input occurs on the static region of the display panel only.

64. A display apparatus comprising:
a display panel having a plurality of pixels; and
a processor, wherein the processor is configured to:

determine a first primary value for a first pixel of the plurality of pixels during a primary period of time, based on displaying a video input on the display panel, wherein determining the first primary value for the first pixel includes monitoring an image history based on the video input during the primary period of time;

determine a second primary value for a second pixel of the plurality of pixels during the primary period of time, based on displaying the video input on the display panel;

calculate a first secondary value for the first pixel of the plurality of pixels to be applied during a secondary period of time;

calculate a second secondary value for the second pixel of the plurality of pixels to be applied during the secondary period of time;

generate a conditioning input, based on the first secondaxy value and the second secondary value, to be displayed on the display panel during the secondary period of time;

generate a database of cumulative average pixel values based on the image history;

display the conditioning input on the display panel for the secondary period of time to reduce a difference between a light output of the first pixel and a light output of the second pixel resulting from displaying the video input on the first pixel and the second pixel of the display panel.

65. The display apparatus of claim 64, wherein the database includes a cumulative average value for each of color components of each of the plurality of pixels.

66. A display apparatus comprising:

a display panel having a plurality of pixels; and a processor, wherein the processor is configured to:

determine a first primary value for a first pixel of the plurality of pixels during a primary period of time, based on displaying a video input on the display panel, wherein determining the first primary value for the first pixel is further based on manufacturing parameters of the display panel;

determine a second primary value for a second pixel of the plurality of pixels during the primary period of time, based on displaying the video input on the display panel;

calculate a first secondary value for the first pixel of the plurality of pixels to be applied during a secondary period of time;

calculate a second secondary value for the second pixel of the plurality of pixels to be applied during the secondary period of time;

generate a conditioning input, based on the first secondary value and the second secondary value, to be displayed on the display panel during the secondary period of time;

display the conditioning input on the display panel for the secondary period of time to reduce a difference between a light output of the first pixel and a light output of the second pixel resulting from displaying the video input on the first pixel and the second pixel of the display panel.

67. A display apparatus comprising:

a display panel having a plurality of pixels; and a processor, wherein the processor is configured to:

determine a first primary value for a first pixel of the plurality of pixels during a primary period of time, based on displaying a video input on the display panel;

determine a second primary value for a second pixel of the plurality of pixels during the primary period of time, based on displaying the video input on the display panel;

determine a dynamic region of the display panel displaying the video input;

determine a static region of the display panel displaying the video input;

calculate a first secondary value for the first pixel of the plurality of pixels to be applied during a secondary period of time;

calculate a second secondary value for the second pixel of the plurality of pixels to be applied during the secondary period of time, wherein the first pixel and the second pixel are located in the static region;

generate a conditioning input, based on the first secondary value and the second secondary value, to be displayed on the display panel during the secondary period of time;

display the conditioning input on the display panel for the secondary period of time to reduce a difference between a light output of the first pixel and a light output of the second pixel resulting from displaying the video input on the first pixel and the second pixel of the display panel.

68. The display apparatus of claim 67, wherein the processor displays the conditioning input on the static region of the display panel, only.

69. A method for use with a display panel having a plurality of pixels, the method comprising:

determining a first primary value for a first pixel of the plurality of pixels during a primary period of time, based on displaying a video input on the display panel;

determining a second primary value for a second pixel of the plurality of pixels during the primary period of time, based on displaying the video input on the display panel;

calculating a first secondary value for the first pixel of the plurality of pixels to be applied during a secondary period of time;

calculating a second secondary value for the second pixel of the plurality of pixels to be applied during the secondary period of time;

generating a conditioning input, based on the first secondary value and the second secondary value, to be displayed on the display panel during the secondary period of time;

displaying the conditioning input on the display panel for the secondary period of time to reduce a difference between a light output of the first pixel and a light output of the second pixel resulting from displaying the video input on the first pixel and the second pixel of the display panel;

wherein the first secondary value for the first pixel and the secondary period of time are calculated such that an average value of the first pixel for the primary period of time and the secondary period of time is approximately equal to one-half of a bit depth of the first pixel.

70. The method of claim 69, wherein the second secondary value for the second pixel is calculated such that an average value of the second pixel for the primary period of time and the secondary period of time is approximately equal to one-half of a bit depth of the second pixel.

71. A device for use with a display panel having a plurality of pixels, the device comprising:
- a processor; and
- a memory including a software program for execution by the processor to perform:
  - determining a first primary value for a first pixel of the plurality of pixels during a primary period of time, based on displaying a video input on the display panel;
  - determining a second primary value for a second pixel of the plurality of pixels during the primary period of time, based on displaying the video input on the display panel;
  - calculating a first secondary value for the first pixel of the plurality of pixels to be applied during a secondary period of time;
  - calculating a second secondary value for the second pixel of the plurality of pixels to be applied during the secondary period of time;
  - generating a conditioning input, based on the first secondary value and the second secondary value, to be displayed on the display panel during the secondary period of time;
  - displaying the conditioning input on the display panel for the secondary period of time to reduce a difference between a light output of the first pixel and a light output of the second pixel resulting from displaying the video input on the first pixel and the second pixel of the display panel;
  - wherein the first secondary value for the first pixel and the secondary period of time are calculated such that an average value of the first pixel for the primary period of time and the secondary period of time is approximately equal to one-half of a bit depth of the first pixel.

72. The device of claim 71, wherein the second secondary value for the second pixel is calculated such that an average value of the second pixel for the primary period of time and the secondary period of time is approximately equal to one-half of a bit depth of the second pixel.

73. A display apparatus comprising:
- a display panel having a plurality of pixels; and
- a processor, wherein the processor is configured to:
  - determine a first primary value for a first pixel of the plurality of pixels during a primary period of time, based on displaying a video input on the display panel;
  - determine a second primary value for a second pixel of the plurality of pixels during the primary period of time, based on displaying the video input on the display panel;
  - calculate a first secondary value for the first pixel of the plurality of pixels to be applied during a secondary period of time;
  - calculate a second secondary value for the second pixel of the plurality of pixels to be applied during the secondary period of time;
  - generate a conditioning input, based on the first secondary value and the second secondary value, to be displayed on the display panel during the secondary period of time;
  - display the conditioning input on the display panel for the secondary period of time to reduce a difference between a light output of the first pixel and a light output of the second pixel resulting from displaying the video input on the first pixel and the second pixel of the display panel;
  - wherein the first secondary value for the first pixel and the secondary period of time are calculated such that an average value of the first pixel for the primary period of time and the secondary period of time is approximately equal to one-half of a bit depth of the first pixel.

74. The display apparatus of claim 73, wherein the second secondary value for the second pixel is calculated such that an average value of the second pixel for the primary period of time and the secondary period of time is approximately equal to one-half of a bit depth of the second pixel.

75. A visual display comprising:
- a display installation including:
  - a display panel including a plurality of pixels each having a bit depth; and
  - an interface in communication with the display panel for receiving a video input and for driving the display panel during an active burn mode; and
- a computer in communication with the display installation for:
  - determining a primary burn value for each of the pixels for the active burn mode;
  - identifying a pixel having a low primary burn value indicating that the identified pixel has been burned at a greater degree than a number of other pixels; and
  - determining a number of pixels each having a primary burn value higher than the low primary burn value indicating that the number of pixels have been burned at a lesser degree than the identified pixel;
  - wherein each of the pixels other than the identified pixel has a difference between the primary burn value thereof and the low primary burn value of the identified pixel; the computer causing the display panel to be driven during a reverse burn mode such that each of the pixels other than the identified pixel is burned to reduce the difference.

* * * * *

UNITED STATES PATENT AND TRADEMARK OFFICE
CERTIFICATE OF CORRECTION

| | |
|---|---|
| PATENT NO. | : 7,317,430 B2 |
| APPLICATION NO. | : 10/660818 |
| DATED | : January 8, 2008 |
| INVENTOR(S) | : Brent McKay |

It is certified that error appears in the above-identified patent and that said Letters Patent is hereby corrected as shown below:

In the claims, column 12, line 66, reading "drives. the display panel" should read --drives the display panel--.

In the claims, column 13, line 20, reading "values, for the color" should read --values for the color--.

In the claims, column 13, line 21, reading "modes. is approximately" should read --modes is approximately--.

In the claims, column 14, line 38, "primaiy" should be changed to --primary--.

In the claims, column 14, line 57, "primaiy" should be changed to --primary--.

In the claims, column 16, line 44, "primaty" should be changed to --primary--.

In the claims, column 18, line 4, "primaty" should be changed to --primary--.

In the claims, column 18, line 42, reading "secondary value, for" should read --secondary value for--.

In the claims, column 18, line 61, "a" should be changed to --the--.

In the claims, column 18, line 66, "the" should be changed to --a--.

In the claims, column 19, line 4, "arc" should be changed to --are--.

In the claims, column 20, line 38, "the" should be changed to --a--.

In the claims, column 20, line 50, "secondaxy" should be changed to --secondary--.

In the claims, column 21, line 18-19, "secondaxy" should be changed to --secondary--.

UNITED STATES PATENT AND TRADEMARK OFFICE
CERTIFICATE OF CORRECTION

| | | |
|---|---|---|
| PATENT NO. | : 7,317,430 B2 | |
| APPLICATION NO. | : 10/660818 | |
| DATED | : January 8, 2008 | |
| INVENTOR(S) | : Brent McKay | |

It is certified that error appears in the above-identified patent and that said Letters Patent is hereby corrected as shown below:

In the claims, column 22, line 32, reading "panel, only." should read --panel only.--.

Signed and Sealed this

Thirteenth Day of May, 2008

JON W. DUDAS
*Director of the United States Patent and Trademark Office*